United States Patent [19]

Kögler et al.

[11] 4,173,146

[45] Nov. 6, 1979

[54] APPARATUS FOR BALANCING UNBALANCED BODIES

[75] Inventors: Horst Kögler, Dieburg; Eickhart Goebel, Pfungstadt, both of Fed. Rep. of Germany

[73] Assignee: Gebr. Hofmann G.m.b.H. & Co. KG, Maschinenfabrik, Darmstadt, Fed. Rep. of Germany

[21] Appl. No.: 909,060

[22] Filed: May 24, 1978

[30] Foreign Application Priority Data

Jul. 20, 1977 [DE] Fed. Rep. of Germany ....... 2732738

[51] Int. Cl.$^2$ ............................................. G01M 1/22
[52] U.S. Cl. ......................................... 73/462; 73/479
[58] Field of Search .................................. 73/462–466, 73/473, 475, 479

[56] References Cited

U.S. PATENT DOCUMENTS

| 2,534,918 | 12/1950 | Kroft et al. | 73/475 X |
| 3,922,922 | 12/1975 | Goebel | 73/462 |

*Primary Examiner*—James J. Gill
*Attorney, Agent, or Firm*—Cushman, Darby & Cushman

[57] ABSTRACT

An apparatus for balancing unbalanced bodies such as motor vehicle wheels having a rotating mounting shaft, a pedestal body in which the mounting shaft is arranged and transducers and other support means for supporting the mounting shaft. The lateral influence of the transducers on each other and the tilting impact of the transducers upon the mounting shaft at their points of contact therewith are minimized by disposing the transducers, other support means and the longitudinal axis of the mounting shaft in a single horizontal plane.

2 Claims, 2 Drawing Figures

APPARATUS FOR BALANCING UNBALANCED BODIES

APPARATUS FOR BALANCING UNBALANCED BODIES

The invention relates to an apparatus for detecting the condition of unbalance of unbalanced bodies such as motor-vehicle wheels in two equalizing planes, having a rotatable shaft for mounting a body, a pedestal body in which the mounting shaft is mounted for rotation and force detecting transducers and other means for supporting the mounting shaft.

Devices for balancing unbalanced bodies having a rotatable shaft for mounting a body, a pedestal body in which the mounting shaft mounted for rotation and force detecting transducers and other means for supporting the mounting shaft are known in the prior art and described in detail, for example, in German Patent Application No. P 23 21 437 and corresponding to U.S. Pat. No. 3,922,922.

In this type of apparatus the mounting shaft may be rotated between a horizontal and a vertical position, the inner casing being supported by leaf springs and transducers against the outer housing. Three transducers are commonly employed in this apparatus in order to support the inner housing against the outer housing and also to prevent the inner housing from overturning. The transducers and the leaf springs are disposed in various planes relative to each other. The transducers engage the mounting shaft off the axis of the mounting shaft.

Transducers that operate according to the load-indication principle will also move slightly in the direction of measurement, and may therefor exert a lateral influence on each other, resulting in errors of measurement. Since the points of contact or engagement of the transducers with the mounting shaft are disposed in different planes relative to each other, slight tilting motions such as those present in dynamometers, will exert influences on these planes that might likewise lead to errors in measurement.

Therefore, it is an object of the invention to provide an apparatus for detecting the condition of unbalance wherein the influence on the transducers laterally and the influences on other planes are minimized to the highest degree possible.

This and other objects of the invention are achieved by locating the supporting means, all the transducers, and the axis of the mounting shaft in one plane.

In a preferred embodiment of the invention, two transducers are laterally arranged in the first plane of measurement next to the mounting shaft and one transducer is disposed in the second plane of measurement at the center directly behind and along the longitudinal axis of the mounting shaft.

In another embodiment of the invention, the transducers are supported by balls against the mounting shaft and the pedestal body.

This arrangement according to the invention places the center of gravity of the mounting shaft and, thereby, the center of gravity of the entire rotating system in the plane of the transducers and the supporting means, so that no lateral influences can be exerted on the transducers. Since this arrangement also permits the lever arm with which the transducers act upon the mounting shaft to be made as short as possible, the errors of measurement which can be caused by the tilting motions of the mounting shaft are very slight. Furthermore, vibration of the rotating unbalanced body cannot cause any movement of the mounting shaft in an axial direction.

Other features and advantages of the invention will be better understood by a consideration of the ensuing description offered by way of non-limitative example, and from the attached drawings where:

Figure 1:
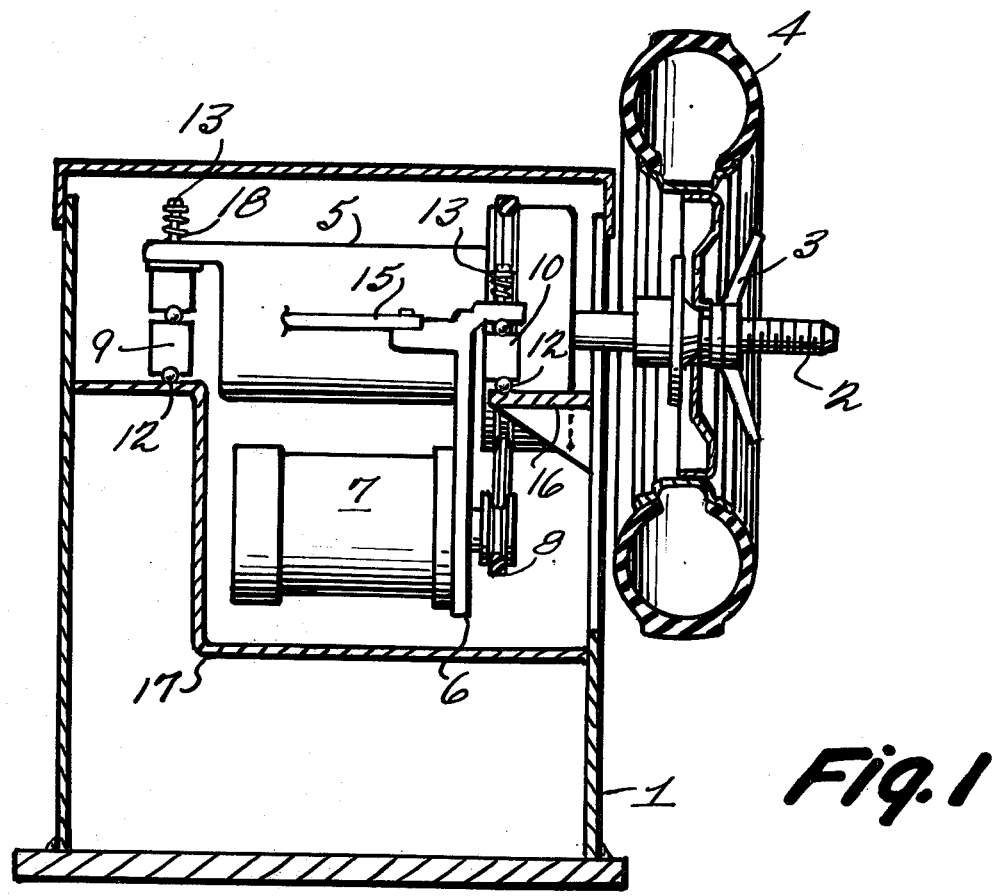
FIG. 1 is a cutaway view of a balancing apparatus.
Figure 2:
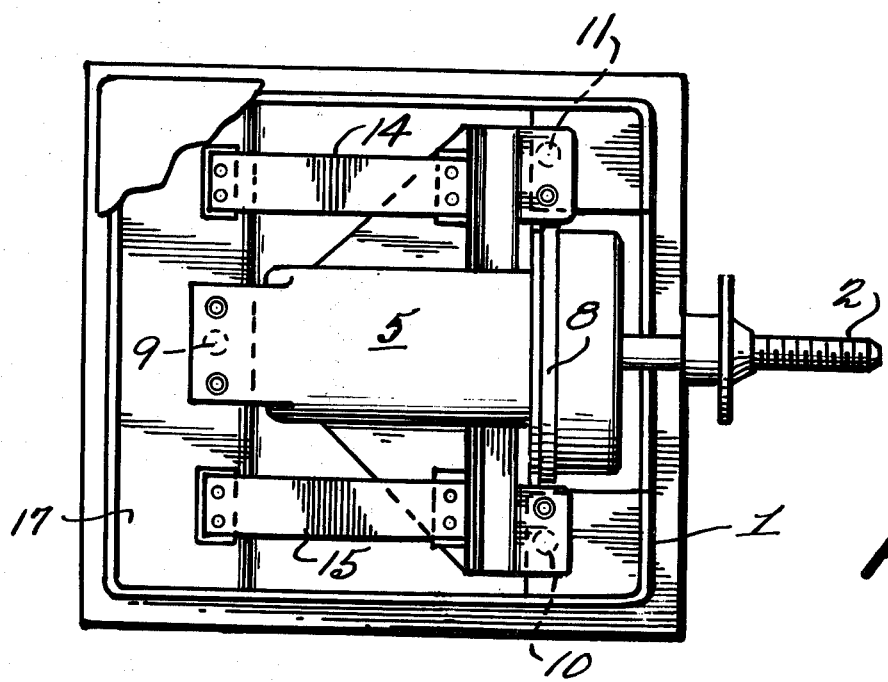
FIG. 2 is a plan view of the balancing apparatus of FIG. 1.

In FIGS. 1 and 2 of the balancing apparatus shown, a mounting shaft 2 is provided in housing 1. The unbalanced bodies, in this case the motor-vehicle wheels 4, may be clamped onto the mounting shaft 2, using mounting devices 3 of known construction. The mounting shaft is rotatably mounted in a known manner in a pedestal body 5, using ball bearings. A transducer 9 is mounted directly onto the pedestal body 5. A drive motor 7 is attached to the pedestal body by a bracket 6. The mounting shaft 2 and, thereby, the motor-vehicle tire 4 to be balanced, are rotated by belt drive 8.

This arrangement ensures that any disturbances caused, for instance, by the belt drive cannot act in the outward direction to affect the measurement readings.

Preferably, the pedestal body 5 is supported against the housing 1 by means of transducers 9, 10, and 11. The housing may be fitted with appropriate bracket 16 and partition 17. Balls or sperical elements 12 may be arranged between the transducers 9, 10 and 11, the pedestal body 5, and the housing 1 to prevent tilting that might affect the measurement.

The transducers 9, 10 and 11 are preloaded with prior art devices. In the example shown, these devices are adjustable screws 13 and springs 18.

In the horizontal plane the pedestal body 5 is supported by means of leaf springs 14 and 15. According to the invention, the leaf springs 14, 15 are laterally arranged at the height of the center axle of the mounting shaft 2 in order to minimize tilting motions of shaft 2.

The points of contact of transducers 9, 10 and 11 are likewise located in the center-axle plane of the mounting shaft 2. Thus, the pedestal body 5 and the mounting shaft 2 are accurately fixed in the horizontal plane and in all of the other degrees of freedom by means of the three transducers 9, 10 and 11 and the supporting elements 14, 15. There is no lateral vibration because the points of contact of the transducers 9, 10, 11 and of the supporting elements 14, 15 are in one plane. Moreover, this ensures that the level arm between pedestal body 5 and transducers 9, 10, 11 can be made as small as possible, so that the tilting motions cannot exert a great influence on the planes of measurement.

What is claimed is:

1. Apparatus for detecting the condition of balance of an unbalanced body in a first and second measuring plane comprising:

a pedestal body;

a mounting shaft having a front portion extending outward from said pedestal body for mounting an unbalanced body and a rear portion rotatably mounted in said pedestal body, along the longitudinal axis of said shaft;

a plurality of force detecting transducer means for horizontally supporting said mounting shaft and producing signals indicating imbalance when said unbalanced body is rotated;

further means for supporting said mounting shaft against movement in all other degrees of freedom;

wherein said plurality of force detecting transducer means, said further supporting means and the longitudinal axis of said mounting shaft are located in a single horizontal plane;

said plurality of force detecting transducer means includes at least three transducers, two of said at least three transducers being laterally arranged in said first plane of measurement adjacent to said mounting shaft; and another of said at least three transducers being disposed in a second plane of measurement behind said rear portion of said mounting shaft centered along the line of the longitudinal axis of said mounting shaft; and a housing which supports said transducers, and said pedestal body, said further supporting means comprising leaf springs fixedly mounted to said housing and said pedestal and laterally arranged in the horizontal plane of said longitudinal axis.

2. Apparatus for detecting the condition of balance of an unbalanced body in a first and second measuring plane comprising:

a pedestal body;

a mounting shaft having a front portion extending outward from said pedestal body for mounting an unbalanced body and a rear portion rotatably mounted in said pedestal body, along the longitudinal axis of said shaft;

a plurality of force detecting transducer means for horizontally supporting said mounting shaft and producing signals indicating imbalance when said unbalanced body is rotated;

further means for supporting said mounting shaft against movement in all other degrees of freedom;

wherein said plurality of force detecting transducer means, said further supporting means and the longitudinal axis of said mounting shaft are located in a single horizontal plane;

said plurality of force detecting transducer means includes at least three transducers, two of said at least three transducers being laterally arranged in said first plane of measurement adjacent to said mounting shaft; and another of said at least three transducers being disposed in a second plane of measurement behind said rear portion of said mounting shaft centered along the line of the longitudinal axis of said mounting shaft; and a housing which encloses said transducers, said rear portion of said mounting shaft, said pedestal body, and said further supporting means; and balls disposed against said transducers for supporting said transducers against said pedestal body and said housing.

* * * * *